(12) United States Patent
Popham et al.

(10) Patent No.: US 10,063,836 B2
(45) Date of Patent: Aug. 28, 2018

(54) TERRAIN VISUALIZATION FOR A VEHICLE AND VEHICLE DRIVER

(75) Inventors: Thomas Popham, Coventry (GB); Anna Gaszczak, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 21 days.

(21) Appl. No.: 14/343,211

(22) PCT Filed: Sep. 4, 2012

(86) PCT No.: PCT/EP2012/067237
§ 371 (c)(1),
(2), (4) Date: Mar. 6, 2014

(87) PCT Pub. No.: WO2013/034562
PCT Pub. Date: Mar. 14, 2013

(65) Prior Publication Data
US 2014/0247328 A1    Sep. 4, 2014

(30) Foreign Application Priority Data
Sep. 6, 2011 (GB) .................................. 1115399.6

(51) Int. Cl.
*H04N 7/18* (2006.01)
*G01S 17/93* (2006.01)
(Continued)

(52) U.S. Cl.
CPC ............. *H04N 13/021* (2013.01); *B60T 7/22* (2013.01); *B60W 50/14* (2013.01); *B60W 50/16* (2013.01);
(Continued)

(58) Field of Classification Search
CPC .... B60R 2021/01259; B60R 2300/105; B60R 2300/60; B60R 2300/86; B60T 7/22;
(Continued)

(56) References Cited
U.S. PATENT DOCUMENTS 5,781,103 A * 7/1998 Gilling ............... B60K 31/0008
                                                    180/169
6,327,522 B1 * 12/2001 Kojima ................. B60K 35/00
                                                    348/115
(Continued)

FOREIGN PATENT DOCUMENTS

GB    2374228 A    10/2002
JP    2005332218 A    12/2005
(Continued)

OTHER PUBLICATIONS

Fisher et al. "Using Time-of-Flight Range Data for Occlusion Handling in Augmented Reality" IPT-EGVE Symposium 2007, pp. 8.*
(Continued)

*Primary Examiner* — Nathnael Aynalem
(74) *Attorney, Agent, or Firm* — Reising Ethington P.C.

(57) ABSTRACT

A visualization technique for a vehicle and a vehicle driver combines a forward facing video camera and a forward facing time of flight camera. The outputs of the camera are combined to provide the vehicle driver with an augmented reality display, whereby topographical features can be identified in relation to the vehicle even if out of line of sight of the driver.

21 Claims, 1 Drawing Sheet

(51) Int. Cl.
| | |
|---|---|
| H04N 13/02 | (2006.01) |
| B60W 50/14 | (2012.01) |
| B60W 50/16 | (2012.01) |
| B60T 7/22 | (2006.01) |
| B60R 21/01 | (2006.01) |
| B60W 10/184 | (2012.01) |
| B60W 10/30 | (2006.01) |
| B60W 30/09 | (2012.01) |
| B60W 30/095 | (2012.01) |

(52) U.S. Cl.
CPC .... *H04N 7/183* (2013.01); *B60R 2021/01259* (2013.01); *B60R 2300/105* (2013.01); *B60R 2300/60* (2013.01); *B60W 10/184* (2013.01); *B60W 10/30* (2013.01); *B60W 30/09* (2013.01); *B60W 30/0956* (2013.01); *B60W 2050/146* (2013.01); *B60W 2420/42* (2013.01); *B60W 2550/14* (2013.01); *B60W 2550/143* (2013.01)

(58) Field of Classification Search
CPC ............... B60W 10/184; B60W 10/30; B60W 2050/146; B60W 2420/42; B60W 2550/14; B60W 2550/143; B60W 30/09; B60W 30/0956; B60W 50/14; B60W 50/16; G06K 9/00369; G06K 9/00805; G06K 9/2018; G06K 9/00778; G06K 9/00785; G06K 9/00791; G06K 9/00798; G06K 9/00812; G06K 9/00818; G06K 9/00825; G06K 9/00832; G06K 9/00845; G06K 9/325; G06K 2209/15; G06T 2207/30236; G06T 2207/30248; G06T 2207/30252; G06T 2207/30256; G06T 2207/30264; G06T 2207/30268
USPC .............................................. 348/49, 148, 47
See application file for complete search history.

(56) References Cited

U.S. PATENT DOCUMENTS

| | | | | |
|---|---|---|---|---|
| 6,396,397 | B1* | 5/2002 | Bos | B60N 2/002 180/167 |
| 7,366,325 | B2* | 4/2008 | Fujimura | G06K 9/00369 382/104 |
| 8,187,097 | B1* | 5/2012 | Zhang | A63F 13/52 463/37 |
| 8,379,924 | B2* | 2/2013 | Schaufler | G06K 9/00805 348/113 |
| 8,412,448 | B2* | 4/2013 | Lee | B60T 7/22 701/300 |
| 2003/0007074 | A1* | 1/2003 | Nagaoka | G06K 9/00805 348/148 |
| 2003/0095080 | A1* | 5/2003 | Colmenarez | G06K 9/00791 345/7 |
| 2004/0075544 | A1* | 4/2004 | Janssen | G08G 1/166 340/435 |
| 2004/0178894 | A1 | 9/2004 | Janssen | |
| 2004/0260469 | A1 | 12/2004 | Mizusawa | |
| 2006/0069478 | A1 | 3/2006 | Iwama | |
| 2006/0274147 | A1* | 12/2006 | Chinomi | B60R 1/00 348/118 |
| 2007/0018887 | A1* | 1/2007 | Feyereisen | G01C 23/00 342/176 |
| 2007/0076526 | A1 | 4/2007 | Aikyo et al. | |
| 2008/0042812 | A1* | 2/2008 | Dunsmoir | G06K 9/00805 340/435 |
| 2008/0180351 | A1* | 7/2008 | He | G01C 23/00 345/1.1 |
| 2008/0224837 | A1* | 9/2008 | Meyer | B60Q 9/005 340/435 |
| 2009/0021609 | A1* | 1/2009 | Luo | G06T 5/006 348/241 |
| 2009/0115593 | A1 | 5/2009 | Avallone et al. | |
| 2009/0265088 | A1* | 10/2009 | Dias | G08G 5/0021 701/120 |
| 2009/0265107 | A1 | 10/2009 | Matsuno | |
| 2010/0117812 | A1* | 5/2010 | Laubinger | B60R 1/00 340/435 |
| 2010/0201816 | A1* | 8/2010 | Lee | B60R 1/12 348/148 |
| 2010/0290674 | A1* | 11/2010 | Kim | G01S 17/89 382/106 |
| 2010/0322477 | A1 | 12/2010 | Schmitt et al. | |
| 2011/0074916 | A1* | 3/2011 | Demirdjian | B60R 1/00 348/36 |
| 2011/0175752 | A1* | 7/2011 | Augst | B60R 1/00 340/905 |
| 2011/0215915 | A1* | 9/2011 | Lee | B60Q 1/00 340/435 |
| 2012/0083982 | A1 | 4/2012 | Bonefas et al. | |
| 2012/0224060 | A1* | 9/2012 | Gurevich | B60R 1/00 348/148 |

FOREIGN PATENT DOCUMENTS

| | | | |
|---|---|---|---|
| JP | 2006096312 | A | 4/2006 |
| JP | 2006246430 | A | 9/2006 |
| JP | 2007098967 | A | 4/2007 |
| JP | 2007159036 | A | 6/2007 |
| JP | 2008126794 | A | 6/2008 |
| JP | 2008213741 | A | 9/2008 |
| JP | 200993332 | A | 4/2009 |
| JP | 2011016484 | A | 1/2011 |
| KR | 20110087112 | | 8/2011 |
| WO | WO2011104706 | A1 | 9/2011 |
| WO | W02012062645 | A1 | 5/2012 |

OTHER PUBLICATIONS

Combined Search and Examination Report corresponding to application No. GB1215779.8, dated Feb. 19, 2013, 5 pages.
Japanese Office action corresponding to application No. 2014-528951, with English summary, dated Mar. 10, 2015, 4 pages.
International Search Report for PCT/EP2012/067237, dated Feb. 26, 2013, 4 pages.
Written Opinion for PCT/EP2012/067237, dated Feb. 26, 2013, 6 pages.
Hogstrom T et al., "Telecommands for remotely operated vehicles", Proceedings 2nd IFAC Conference on Intelligent Autonomous Vehicles, 1995, p. 375-380, ISBN 0-08-042366-3, Lulea, Sweden.
Kahlmann T et al., "3D-TOF sensors in the automobile", Proceedings of the SPIE—The International Society for Optical Engineering, 2005, vol. 5663, Nr 1, pp. 216-224, ISSN 0277-786X, Zurich, Switzerland.
Acharya et al., "System design of time-of-flight range camera for car park assist and backup application", 2008 IEEE Computer Society Conference on Computer Vision and Pattern Recognition Workshops, 2008, pp. 1-6, Sunnyvale, CA.
Combined Search and Examination Report for GB1115399.6, dated Dec. 22, 2011, 7 pages.
Japanese Office Action, in Japanese with English summary, corresponding to JP application No. 2014-528951, dated Apr. 5, 2016, 7 pages.

\* cited by examiner

TERRAIN VISUALIZATION FOR A VEHICLE AND VEHICLE DRIVER

This invention relates to terrain visualization, and has particular application in off-road driving. Aspects of the invention relate to a system, to a vehicle and to a method.

Many vehicles have an off-road capability. Use of that vehicle capability may however be restricted by the ability and experience of the vehicle driver. Thus, for example, the vehicle driver may be unfamiliar with the vehicle ground clearance, vehicle wheelbase and vehicle approach and departure angles, all of which must be considered in determining whether a vehicle will clear a topographical obstacle.

A particular problem is that the vehicle driver will lose sight of an obstacle, for example a boulder or a depression, well before the vehicle front wheels reach the obstacle. At low speed (<20 kph) and particularly at very low speed (<5 kph), the vehicle driver may not be able to judge when the obstacle will reach the vehicle wheels, nor be able to visualize what will happen to the vehicle having regard to other typographical features. Furthermore the driver must estimate the position of the obstacle in relation to the vehicle front wheels notwithstanding that the vehicle may be subject to steering inputs and corrections. The driver must also remain aware of the obstacle as it passes the rear wheels.

A more general problem is knowing whether the vehicle will clear the obstacle even if it is in full view, such as when driving through a narrow gap or gully.

Cameras and distance sensors may be provided for sensing distance to an obstacle, but generally provide poor information regarding depth of field. They thus are useful when moving close to an obstacle, such as when parking, but are not useful where obstacles must be crossed. The consequence of poor driver judgement may be damage to the vehicle, immobilization of the vehicle in the terrain, and/or risk of injury to the vehicle occupants.

What is required is a method and apparatus for better providing terrain visualization, both as an input to vehicle systems and as a reference to a driver of the vehicle.

Aspects of the invention therefore provide a system, a vehicle and a method as claimed in the appended claims.

According to one aspect of the present invention there is provided a vehicle having a camera for capturing a scene ahead of the vehicle, a visual display device for showing information from said scene to the driver, and a time of flight camera system configured to repeatedly capture an electronic image of said scene for generating a three-dimensional model of the scene, wherein the colour image of the scene is combined with said three-dimensional model and displayed on said display device. A region of interest in said scene is visually enhanced on said display according to pre-determined criteria relating to one or more of size, shape and position within the image of said region of interest.

It may be that the region of interest is an obstacle. It may be that the region of interest is an object or feature which is of interest to the driver but is not an obstacle. It may be that the region of interest is a particular feature of the terrain such as a rut or a gradient such as a particular level of steepness.

The vehicle driver can thus be provided with an enhanced image of the scene from any selected viewpoint. In particular the display device may show a plan or birds-eye view of the scene, from which the vehicle driver is better able to judge the distance of an obstacle from the vehicle, and the position of an obstacle in relation to the vehicle. In particular the plan view permits the driver to see obstacles up to the point of contact with the vehicle. The system may also compensate for the set-back of the front wheels from the front of the vehicle since the position of the camera in relation to the wheels is fixed.

Time of flight camera systems have an image resolution of 5 mm or better. As a consequence the display device may be provided with a zoom feature whereby the image may be enlarged with respect to a point of interest. In this way the vehicle driver may monitor passage of a part of the vehicle over the terrain, in particular during passage of a significant topographical interruption such as a rock step or a hole.

The invention may select a point of view best able to represent the scene to the driver. Thus for example the best viewing angle for warning the driver of the closeness of an obstacle may be selected.

Closeness of an obstacle may be indicated audibly, for example by a suitable chime, and the obstacle may be enhanced on the display by use of a suitable technique, such as a colour wash, circle or the like.

The invention may further employ augmented reality techniques to overlay contour or mesh information from the time of flight camera onto one or more colour images of the scene, and show an augmented image on said display. The augmented image may comprise one or more real-time video streams of the scene ahead of the vehicle.

Important obstacles in the augmented image may be identified to the driver by marking on the display or by other appropriate audio or visual technique. Important obstacles may be those passing certain qualification criteria, such as closeness, size, shape or relative position. These criteria may for example be held in a look-up table or like device, and be automatically selected to present the driver with sufficient but not excessive information regarding the obstacles to be crossed. The severity criteria and type criteria for obstacle enhancement may alternatively be driver selectable.

Obstacles may be identified by known machine vision recognition techniques or pattern recognition systems, and compared with severity and type criteria.

In an embodiment, the driver may be presented with information about the forward path of the vehicle, for example on the display. Repeating time of flight images permit relative position of the vehicle to be determined in relation to points of interest in the scene. Such points of interest may be selected automatically so as to calculate continually the instant path of the vehicle. In particular since a three-dimensional model of the scene is continually generated, attitude of the vehicle can be determined according to slope of the terrain. Thus, for example, side clearance can be monitored in a steep sided gully with side to side ground slope, and appropriate alerts provided to the vehicle driver.

The cameras of the vehicle are generally in a fixed position and forward facing. On smooth ground the repeating image will show the scene from the substantially same viewpoint, and with a substantially fixed field of view. When off-road, pitch, roll and yaw of the vehicle will change the point of view of one or both cameras.

In an embodiment scene data is repeatedly stored in a memory to permit a full view of a scene to be constructed by combining data from previous frames of the time of flight camera system, thereby to generate a display for the driver appropriate to the instant direction of travel. Such an embodiment may be particularly useful where the locations of the video camera and time of flight camera are spaced apart.

In the event of a large obstacle being encountered ahead, or an inappropriate vehicle manoeuvre being predicted, the invention further permits automatic braking of the vehicle by command to an electronically enabled vehicle brake. A driver override may be provided.

It may be that the vehicle has an electronically enabled braking system adapted to be activated automatically by a collision calculator. It may be that said calculator is adapted to be disabled by the vehicle driver.

According to another aspect of the invention there is provided a system for a vehicle comprising a camera for capturing a scene ahead of the vehicle, a visual display device for showing information from said scene to the driver, and a time of flight camera system adapted to repeatedly capture an electronic image of said scene for generating a three-dimensional model of the scene, wherein the image of the scene is combined with said three-dimensional model and displayed on said display device.

According to a further aspect of the invention there is provided a method of visualizing the scene in front of a moving vehicle having a visual display device for the vehicle driver, the method comprising the steps of:

capturing from the vehicle a substantially continuous colour representation of said scene;

capturing repeating image data of said scene from a vehicle mounted time of flight camera system;

generating a three-dimensional model of said scene from said repeating image data;

combining said model and image to give an augmented representation of said scene on said display; and visually enhancing a region of interest in said scene on said display according to pre-determined criteria relating to one or more of size, shape and position within the image of said region of interest.

It may be that the region of interest is an obstacle. It may be that the region of interest is an object or feature which is of interest to the driver but is not an obstacle. It may be that the region of interest is a particular feature of the terrain such as a rut or a gradient such as a particular level of steepness.

Within the scope of this application it is envisaged that the various aspects, embodiments, examples, features and alternatives set out in the preceding paragraphs, in the claims and/or in the following description and drawings may be taken independently or in any combination thereof. For example features described in connection with one embodiment are applicable to all embodiments, except where there is incompatibility of features.

Embodiments of the present invention will now be described, by way of example only, with reference to the accompanying drawings, in which.

Figure 1:
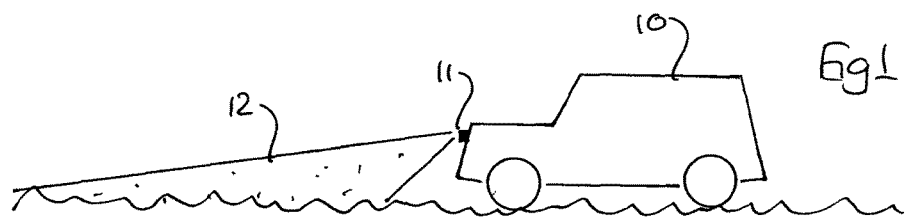
FIG. 1 illustrates a vehicle incorporating the present invention, in side elevation.

With reference to FIG. 1, a vehicle 10 with off-road capability has a forward facing time of flight camera 11 illuminating a scene ahead of the vehicle with infra-red light 12.

Topographical features of the scene are repeatedly imaged in the time of flight camera system, for example at a rate of 40 frames per second. Known discrimination and identification techniques are used to identify and track features in the scene according to reference criteria, of for example shape, size and relative position. The techniques used may for example determine severity of an obstacle by reference to a notional ground plane.

Figure 2:
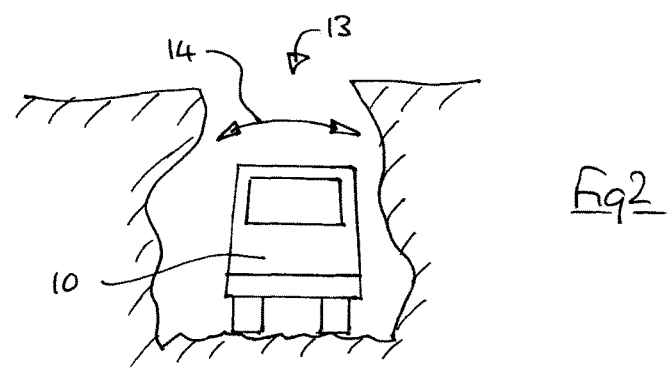
FIG. 2 illustrates a vehicle in a rock gulley.

FIG. 2 illustrates a vehicle 10 in a deep gully 13. The camera 11 may be arranged to illuminate the scene at the vehicle height so as to image and identify topographical features at the side of the vehicle which may become obstacles should the vehicle get too close, for example by rolling as indicated by arrow 14.

Figure 3:
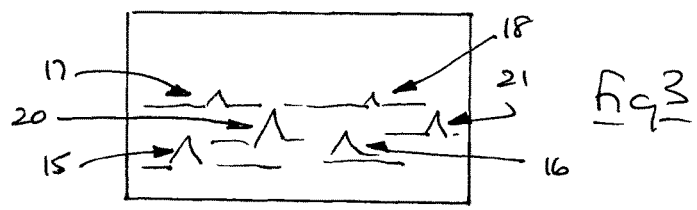
FIG. 3 illustrates an image from a time of flight camera.

FIG. 3 illustrates schematically an image from a time of flight camera system in which certain topographical features are identified as obstacles, in this case rocks upstanding from a ground plane. Two rocks 15,16 are near, two rocks 17,18 are far, and two rocks, 20,21 are in the middle distance.

The vehicle 10 is also provided with a forward facing colour camera (not shown) providing a video stream of the scene. Processing techniques, which do not form part of the present invention are used to combine the video stream and information from the image of the time of flight camera to provide an augmented reality video stream of the scene.

In this augmented reality video stream, topographical features which are identified as significant are identified by a suitable technique and displayed on an in-car display for the driver.

Figure 4:
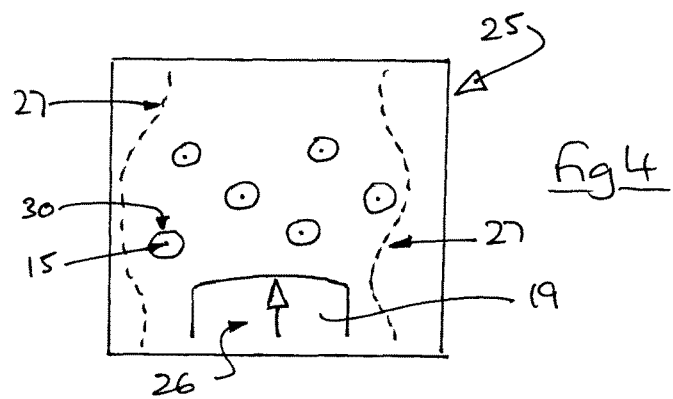
FIG. 4 shows schematically a driver display of the invention.

FIG. 4 illustrates in plan circles 30 around each feature of the video stream 25, but a colour wash, pulsing technique or other visual cue is of course possible. The prominence of the visual cue may be linked to the severity of the topographical feature in relation to criteria of shape, size and relative position.

Also illustrated in FIG. 4 is the bonnet 19 of the vehicle and the approximate direction of travel 26.

The plan (or birds-eye) view of FIG. 4 allows the vehicle driver to judge the position and severity of each obstacle even though it may not be within his field of view from the driving seat. He is thus provided with a reference as the vehicle slowly advances, and can associate suspension inputs and changes of vehicle attitude.

It will be appreciated that a birds-eye display also allows the driver to pick a suitable route through and around obstacles, for example according to the size and severity indicated.

Augmented reality techniques permit the vehicle wheels to be shown in addition to the vehicle. Thus in FIG. 4 the vehicle outline may be indicated by peripheral line or light colour wash and the wheels as black rectangles. In this way passage of obstacles to and under each wheel can be tracked.

The vehicle driver may zoom or pan the visual image in order to determine the topographical area displayed on the display screen. Thus the driver may wish to see passage of the vehicle rear wheels in relation to an obstacle, or see further ahead in order to plan a route through several obstacles. The video stream and time of flight information moves with the vehicle to always show the scene in the direction of vehicle movement.

The vehicle driver may select the point of view of the displayed visual image, though a plan view is considered to be the most useful for off road travel.

In the case of a gully or trench (FIG. 2) the closest position of side features may be represented on the visual display, for example as a dotted line feature 27.

Pitch, roll and yaw information is generally available from vehicle systems, and provides a further input for the implementation of the present invention. Such information is typically available from accelerometers. In an enhanced embodiment, likely roll, pitch and yaw in response to terrain features can be displayed on the visual display, for example as a coloured band. Such a band typically has a width related to vehicle speed, and may encourage the vehicle driver to modify a driving style in accordance with the likelihood of contact with the terrain or obstacles in the terrain.

The vehicle may have variable height suspension, and variable pitch and roll characteristics according to the selected suspension height. The width of a coloured risk band may thus increase as suspension is raised to warn the driver of an increased risk of contact. The vehicle braking system may be automatically actuated in the event that the sprung mass of the vehicle moves into a risk band.

The invention claimed is:

1. A vehicle having a color camera for capturing a color image of a scene ahead of the vehicle, a visual display device for showing information from said scene to a driver of the vehicle, and a time of flight camera system adapted to repeatedly capture an electronic image of said scene for generating a three-dimensional model of the scene ahead of the vehicle, wherein the color image and information included in the three-dimensional model of the scene ahead of the vehicle are combined and displayed on said display device,
wherein a region of interest that is contained in said color image is visually enhanced on said display according to pre-determined criteria relating to one or more of size and shape of a topographical feature within the image of said region of interest to indicate the severity of the topographical feature in the region of interest according to the pre-determined criteria;
wherein a prominence of the visual enhancement of the region of interest indicates the severity of the topological features as determined by the information included in the three dimensional model, and wherein multiple visual enhancements are displayed in the region of interest in response to a detection of a plurality of topographical features, the multiple visual enhancements comprising at least two levels of prominence corresponding to different levels of severity of the associated topographical feature.

2. A vehicle according to claim 1, wherein said scene is displayed in plan.

3. A vehicle according to claim 1, wherein a point of view of said scene is variable.

4. A vehicle according to claim 3, wherein the point of view is selectable by the vehicle driver.

5. A vehicle according to claim 1, wherein a region of interest in said scene is visually enhanced on said display according to pre-determined criteria relating to the proximity of said region of interest.

6. A vehicle according to claim 1, wherein one or more of said criteria are driver selectable.

7. A vehicle according to claim 1, wherein attitude of said vehicle is determined for three-dimensional application of said criteria.

8. A vehicle according to claim 1, and having an electronically enabled braking system adapted to be activated automatically by a collision calculator.

9. A vehicle according to claim 8, wherein said calculator is adapted to be disabled by the vehicle driver.

10. A vehicle or method according to claim 1, wherein the region of interest is an obstacle.

11. A vehicle according to claim 1, wherein the topographical feature comprises a terrain feature, wherein the terrain feature comprises at least one of: a rut, a gradient, a hole on the ground, a side clearance, and rocks.

12. A vehicle according to claim 1, wherein the visual enhancement is one of a shape displayed in the region of interest, a color displayed in the region of interest, and a pulsing technique displayed in the region of interest.

13. A vehicle according to claim 1, wherein the multiple visual enhancements comprise one of different colors and different pulsing techniques.

14. A method of visualizing a scene in front of a moving vehicle having a visual display device for the vehicle driver, the method comprising:
capturing from the vehicle a color representation of said scene;
capturing repeating image data of said scene in front of the vehicle from a vehicle mounted time of flight camera system;
generating a three-dimensional model of said scene in front of the vehicle from said repeating image data;
combining information included in said model and said image of said scene in front of the vehicle to give an augmented representation of said scene on said display;
visually enhancing a region of interest in said scene that is contained in said color representation of said scene on said display according to pre-determined criteria relating to one or more of size and shape within the image of said region of interest to indicate the severity of a topographical feature in the region of interest according to the pre-determined criteria, wherein a prominence of the visual enhancement of the region of interest indicates the severity of the topological features as determined by the information included in the model, wherein multiple visual enhancements are displayed in the region of interest in response to a detection of a plurality of topographical features, the multiple visual enhancements comprising at least two levels of prominence corresponding to different levels of severity of the associated topographical feature.

15. A method according to claim 14, and including the step of displaying said augmented representation in plan.

16. A method according to claim 14, and including the step of providing a selectable point of view of said augmented representation.

17. A method according to claim 14, and including the step of zooming said augmented representation to a selected enlargement.

18. A method according to claim 14, and including the step of determining the attitude of the vehicle in selecting the region of interest to be enhanced.

19. A method according to claim 14, wherein the topographical feature comprises a terrain feature, wherein the terrain feature comprises at least one of: a rut, a gradient, a hole on the ground, a side clearance, and rocks.

20. A method according to claim 14, the method comprising visually enhancing a region of interest in said image on said display according to pre-determined criteria relating to position within the image of said region of interest.

21. A method according to claim 14, wherein the multiple visual enhancements comprise one of different colors and different pulsing techniques.

* * * * *